United States Patent
Curchod

(10) Patent No.: US 10,080,949 B2
(45) Date of Patent: Sep. 25, 2018

(54) SYSTEM AND METHOD FOR RANKING OF GOLF TOURNAMENT PARTICIPANTS

(71) Applicant: Donald Butler Curchod, Avalon (AU)

(72) Inventor: Donald Butler Curchod, Avalon (AU)

(73) Assignee: Donald Butler Curchod, Avalon NSW (AU)

( * ) Notice: Subject to any disclaimer, the term of this patent is extended or adjusted under 35 U.S.C. 154(b) by 3 days.

(21) Appl. No.: 15/068,431

(22) Filed: Mar. 11, 2016

(65) Prior Publication Data

US 2016/0263463 A1    Sep. 15, 2016

Related U.S. Application Data

(63) Continuation-in-part of application No. 15/046,392, filed on Feb. 17, 2016.
(Continued)

(51) Int. Cl.
*A63F 9/24* (2006.01)
*A63B 71/06* (2006.01)
(Continued)

(52) U.S. Cl.
CPC .............. *A63B 71/06* (2013.01); *A63B 71/00* (2013.01); *A63B 71/0616* (2013.01); *G06Q 50/00* (2013.01)

(58) Field of Classification Search
None
See application file for complete search history.

(56) References Cited

U.S. PATENT DOCUMENTS 5,886,995 A * 3/1999 Arsenault .......... H04B 7/18523
                                                           348/384.1
6,443,838 B1 * 9/2002 Jaimet .................... G06Q 50/34
                                                           463/16
(Continued)

FOREIGN PATENT DOCUMENTS

WO    WO-2015/057443 A1    4/2015

OTHER PUBLICATIONS

"FedEx Cup." *Wikipedia: The Free Encyclopedia*. Wikimedia Foundation, Inc., Mar. 11, 2016. Web. Jun. 24, 2016.
(Continued)

*Primary Examiner* — Paul A D'Agostino
(74) *Attorney, Agent, or Firm* — Mintz, Levin, Cohn, Ferris, Glovsky and Popeo, P.C.

(57) ABSTRACT

A first media segment, for example a rebroadcast, is assembled that includes a portion of second media segment, for example an independent tournament event. The second media segment is longer in duration than first media segment. The second media segment is a media recording of one of the major golf tournaments or a sub-major golf tournament. The first media segment includes a portion of a major golf tournament combined with a portion of a sub-major golf tournament. A portion (or multiple portions) of the second media segment is extracted as part of assembling the first media segment. The portion(s) are combined to form the first media segment (e.g. the rebroadcast, summary, or recap). A broadcast system transmits, to a media receiver, the first media segment at a predefined time after the tournaments corresponding to the second media segment have been completed.

17 Claims, 8 Drawing Sheets

Related U.S. Application Data

(60) Provisional application No. 62/117,160, filed on Feb. 17, 2015, provisional application No. 62/174,420, filed on Jun. 11, 2015.

(51) Int. Cl.
*A63B 71/00* (2006.01)
*G06Q 50/00* (2012.01)

(56) References Cited

U.S. PATENT DOCUMENTS

| | | | | |
|---|---|---|---|---|
| 6,571,143 | B1 | 5/2003 | Mallamo | |
| 9,432,444 | B1* | 8/2016 | Cansino | G06F 17/30864 |
| 2007/0086724 | A1* | 4/2007 | Grady | H04N 5/765 |
| | | | | 386/230 |
| 2007/0207845 | A1* | 9/2007 | Gottlieb | A63F 13/12 |
| | | | | 463/9 |
| 2007/0225056 | A1 | 9/2007 | Lewis et al. | |
| 2007/0265966 | A1* | 11/2007 | Kahn | G06F 21/10 |
| | | | | 705/51 |
| 2007/0265967 | A1* | 11/2007 | Kahn | G06F 21/10 |
| | | | | 705/51 |
| 2007/0265968 | A1* | 11/2007 | Kahn | G06Q 20/382 |
| | | | | 705/51 |
| 2007/0265970 | A1* | 11/2007 | Kahn | H04N 7/162 |
| | | | | 705/52 |
| 2007/0265973 | A1* | 11/2007 | Kahn | G06F 21/10 |
| | | | | 705/57 |
| 2007/0265978 | A1* | 11/2007 | Kahn | G06Q 30/04 |
| | | | | 705/59 |
| 2007/0266414 | A1* | 11/2007 | Kahn | H04N 7/162 |
| | | | | 725/113 |
| 2008/0089658 | A1* | 4/2008 | Grady | H04N 5/225 |
| | | | | 386/200 |
| 2008/0089667 | A1* | 4/2008 | Grady | G11B 27/034 |
| | | | | 386/200 |
| 2008/0092200 | A1* | 4/2008 | Grady | G11B 27/034 |
| | | | | 725/133 |
| 2008/0138028 | A1* | 6/2008 | Grady | H04N 1/00299 |
| | | | | 386/291 |
| 2010/0004039 | A1 | 1/2010 | Kelly, Jr. et al. | |
| 2010/0048302 | A1* | 2/2010 | Lutnick | G07F 17/32 |
| | | | | 463/42 |
| 2012/0230651 | A1* | 9/2012 | Chen | H04N 5/44543 |
| | | | | 386/231 |
| 2014/0031105 | A1* | 1/2014 | Givant | G07F 17/3276 |
| | | | | 463/25 |
| 2014/0370966 | A1* | 12/2014 | Bahou | G07F 17/3225 |
| | | | | 463/25 |
| 2016/0263462 | A1 | 9/2016 | Curchod | |
| 2016/0346661 | A1 | 12/2016 | Curchod | |

OTHER PUBLICATIONS

"PGA European Tour." *Wikipedia: The Free Encyclopedia*. Wikimedia Foundation, Inc., Apr. 28, 2016. Web. Jun. 24, 2016.
"PGA Grand Slam of Golf." *Wikipedia: The Free Encyclopedia*. Wikimedia Foundation, Inc., May 16, 2016. Web. Jun. 24, 2016.
"Race to CME Globe." *Ladies Professional Golf Association, LGPA*. Web. Jun. 24, 2016.
"Samsung World Championship." *Wikipedia: The Free Encyclopedia*. Wikimedia Foundation, Inc., Apr. 8, 2016. Web. Jun. 24, 2016.
"The Players Championship." *Wikipedia: The Free Encyclopedia*. Wikimedia Foundation, Inc., Jun. 11, 2016. Web. Jun. 24, 2016.
"World Golf Championships." *Wikipedia: The Free Encyclopedia*. Wikimedia Foundation, Inc., May 13, 2016. Web. Jun. 24, 2016.
International Search Report and Written Opinion issued in International Application No. PCT/IB2016/000330, dated Jun. 14, 2016.
Official World Golf Ranking "How the Ranking Evolved", [retrieved from internet on Jun. 7, 2016]. <URL:https://web.archive.org/web/20140521025558/http://www.owgr.com/about?tabID=%7B30A8C9C7-0A88-4D29-AF92-E44EF02BB899%7D > published on May 21, 2014 as per Wayback Machine.
Official World Golf Ranking "How the Ranking System Works", [retrieved from internet on Jun. 7, 2016]. <URL:https://web.archive.org/web/20140114055705/http://www.owgr.com/about> published on Jan. 14, 2014 as per Wayback Machine.
Official World Golf Ranking "Rankings Week 1", [retrieved from internet on Jun. 3, 2016]. <URL:https://web.archive.org/web/20140112062048/http://www.owgr.com/ranking> published on Jan. 12, 2014 as per Wayback Machine.
Stefani, R. T. "Survey of the major world sports rating systems." *Journal of Applied Statistics* vol. 24, No. 6, 1997, pp. 635-646.

* cited by examiner

Majors Series 2014

| Masters | Mast Place | US Open | US Open Place | WC cum stage 2 | B Open | B Open place | Cum WC stage 3 | PGA | PGA Place | WC Final | Cum stage 4 | FINAL WC posn. |
|---|---|---|---|---|---|---|---|---|---|---|---|---|
| Watson B | 1 | Kaymer | 1 | | 32 McIlroy | 1 | 32 | McIlroy | 1 | Fowler | 12 | 1 |
| Blixt | 2 | Fowler | 2 | | 7 Fowler | 2 | 9 | Stenson | 2 | McIlroy | 33 | 2 |
| Speith | 2 | Bradley | 4 | XXX | Garcia | 2 | 37 | Mickelson | 2 | Furyk | 34 | 3 |
| Fowler | 5 | Day | 4 | | 24 Furyk | 4 | 30 | Fowler | 3 | Scott | 43 | 4 |
| McIlroy | 8 | Johnson D | 4 | | 59 Leishman | 5 XXX | | Furyk | 4 | Walker | 50 | 5 |
| Walker | 8 | Stenson | 4 | | 18 Scott | 5 | 28 | Palmer | 5 | Stenson | 59 | 6 |
| Stenson | 14 | Scott | 9 | | 23 Molinari | 7 XXX | | Dubuisson | 7 | Mickelson | 81 | 7 |
| Furyk | 14 | Snedeker | 9 | | 46 Schwartzel | 7 XXX | | Walker | 7 | Day | 97 | 8 |
| Scott | 14 | Walker | 9 | | 17 Lowery | 9 XXX | | Els | 7 | Speith | 129 | 9 |
| Day | 20 | Furyk | 12 | | 26 Dubuisson | 9 XXX | | Mahan | 7 | Johnson | 171 | 10 |
| Mickleson | 28 | Speith | 17 | | 19 McDowell | 9 | | Stricker | 7 | Kaymer | 176 | 11 |
| Kaymer | 31 | McIlroy | 23 | | 31 Johnson | 12 | 71 | Snedeker | 13 | Watson B | 193 | 12 |
| Stricker | 31 | Mickleson | 28 | | 87 Mickleson | 23 | 57 | Day | 15 | | | |
| Snedeker | 37 | Dubuisson | 28 | | 56 Walker | 26 | 43 | Warren | 15 | | | |
| Els | 52 | Els | 35 | | 87 Speith | 36 | 82 | Scott | 15 | | | |
| Johnson | 52 | Garcia | 35 | | 87 Stenson | 39 | 79 | Garcia | 35 | | | |
| Dubuisson | 52 | Watson | 68 | | 69 Day | 58 | 55 | Watson | 64 | | | |
| Garcia | 52 | McDowell | | | Watson B | 60 | 102 | Kaymer | 74 | | | |
| | | | | | Kaymer | 70 | 129 | Speith | 74 | | | |
| | | | | | | | | Johnson | 100 | | | |

|  | Rank (1st) | Rank (2nd) | Cum(1+2) | Final Rank |
|---|---|---|---|---|
| Player 1 | 1 | 1 | 2 | 1 |
| Player 2 | 2 | 3 | 5 | 2* |
| Player 3 | 3 | 4 | 7 | 3 |
| Player 4 | 4 | 2 | 6 | 2* |

|  | Rank(1st) | Rank (2nd) | Cum(1+2) | Final Rank |
|---|---|---|---|---|
| Player 1 | 1 | 2 | 3 | 1 |
| Player 2 | 2 | 3 | 5 | 2* |
| Player 3 | 3 | 4 | 7 | 3 |
| Player 4 | 4 | 1 | 5 | 2* |

Fig. 5

SYSTEM AND METHOD FOR RANKING OF GOLF TOURNAMENT PARTICIPANTS

CROSS-REFERENCE TO RELATED APPLICATIONS

The current application is a continuation-in-part of U.S. patent application Ser. No. 15/046,392 filed Feb. 17, 2016, which is related to/claims priority under 35 U.S.C. § 119(e) to U.S. Provisional Patent Application No. 62/117,160 filed Feb. 17, 2015 and U.S. Provisional Patent Application No. 62/174,420, filed Jun. 11, 2015, the contents of each are hereby incorporated by reference in their entirety.

TECHNICAL FIELD

The subject matter described herein relates to the generation of ranked player data from connected computing systems.

BACKGROUND

Current golf tournaments are structured to span a number of individual games, eventually culminating in tournaments such as a Major tournament. Each of the Major tournaments carries its own unique features and provides a winner for each tournament. The Major tournaments are not formally connected in any way, instead serving as prestigious individual events. Accordingly, there is no current crowing of a golf world champion.

SUMMARY

In one aspect, a first media segment, for example a rebroadcast, can be assembled that can include a portion of second media segment. The second media segment can be longer in duration than first media segment. The second media segment can be a media recording of one of the major golf tournaments or a sub-major golf tournament. The first media segment includes a portion of the major golf tournaments combined with a portion of a sub-major golf tournament.

A portion (or multiple portions) of the second media segment can be extracted as part of assembling the first media segment. The portion(s) can be combined to form the first media segment (e.g. the rebroadcast, summary, or recap). A broadcast system can transmit to a media receiver the first media segment at a predefined time after tournaments corresponding to the second media segment have been completed.

In some variations one or more of the following features can optionally be included in any feasible combination.

The first media segment can include an audio portion and a video portion. The first media segment can be transmitted via an internet connection. Also the media receiver can be a computing device. The first media segment can include a score, a cumulative score, or a ranking, for any player or players in at least one independent tournament event. The first media segment can include least seven portions corresponding to four different major golf tournaments and three sub-major golf tournaments. Also, the first media segment can include a portion of a playoff golf event.

The first duration of the first media segment can be less than half of a second duration of the second media segment. In particular, the first duration can be approximately one hour and the second duration can be at least 4 hours.

DESCRIPTION OF DRAWINGS

These and other aspects will now be described in detail with reference to the following drawings.

FIG. 3 is a table illustrating the calculation of a cumulative score based on individual tournament event rankings, according to one embodiment;

FIG. 5 is a table illustrating the determination of a required score to attain a preselected ranking, according to one embodiment;

DETAILED DESCRIPTION

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to ranking of golf tournament participants and the usage of said rankings, it should be readily understood that such features are not intended to be limiting.

As used herein, a "Major" or "independent tournament event" can be defined to include a tournament with the majority of the world's top players competing regardless of country of origin or type of Tour or sporting event.

Figure 1:
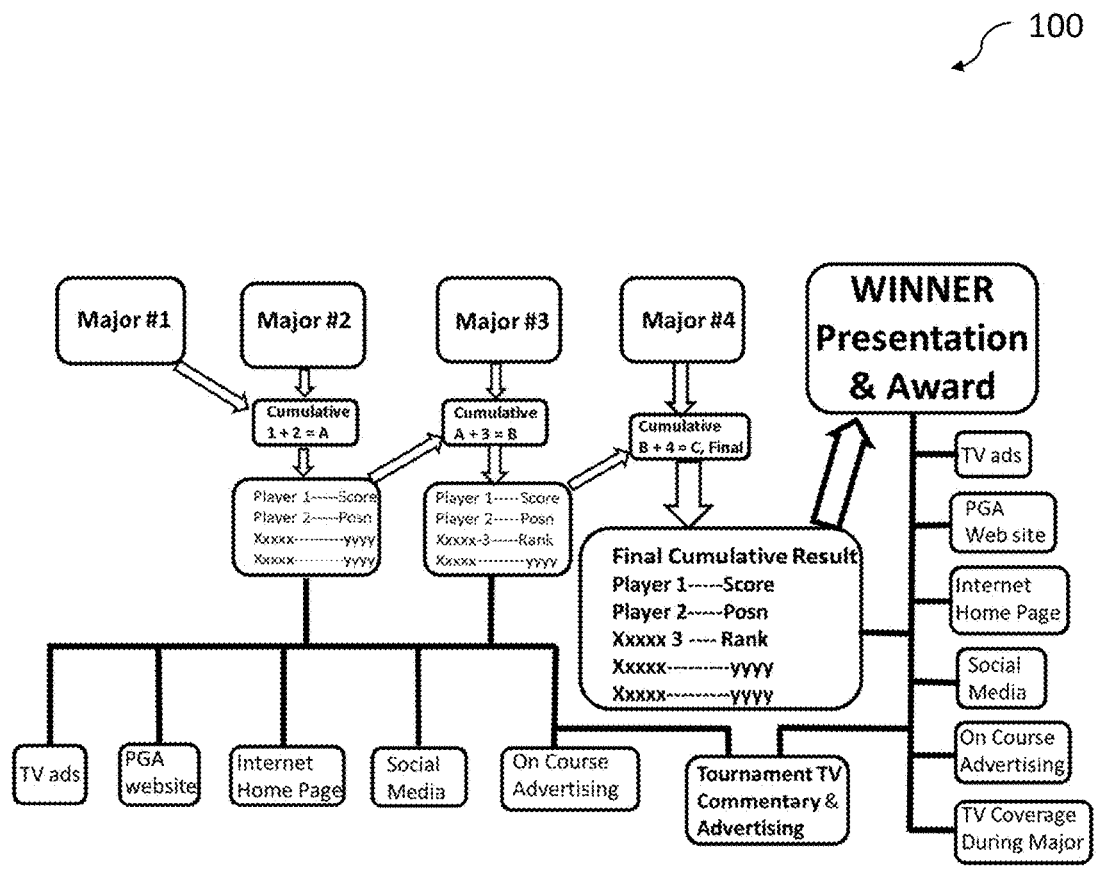
FIG. 1 is a diagram illustrating the flow of calculating a cumulative score across a series of independent tournament events, according to one embodiment.

FIG. 1 is a diagram 100 illustrating the flow of calculating a cumulative score across a series of independent tournament events. Some independent tournament events, one example in the sport of golf being the Majors, often feature players which participate in one or more of the tournaments but are not recognized for their overall accomplishments. Moreover, it is notoriously difficult for a player to win consecutive independent tournament events. Nevertheless, over the course of the independent tournament events certain players become dominant over the others, possibly having different rankings in each independent tournament event, but still maintaining their overall general position. Also, the showings in each of the independent tournament events do not necessarily carry over to the other. In this way, a player that performs consistently well, despite not winning any of the independent tournament events, can be overshadowed, perhaps undeservedly, by a player that wins one of the independent tournament events. Though the independent tournament events described herein are presented in terms of golfing events, specifically the Majors, the independent tournament events can be any type of event in any type of sport or contest. Other types of independent tournament events can further include, for example, the Women's Tour, Men's Tour, and Senior's Tour.

As shown in FIG. 1, the four Majors are represented as independent tournament events. Upon completion of the first Major, a score can be calculated for the players that participated in that Major. Upon completion of a second Major, a cumulative score can be calculated. The score or the cumulative score can be calculated in any number of ways. For example, the score or the cumulative score can be based on points under or over par, include scaling for number of holes completed, adjusted for difficulty of the independent tournament event, etc. Scores can also be based on rankings achieved during one or more of the independent tournament events.

One benefit of tracking a cumulative score is that it links previously independent events into something larger, thus encouraging interest from fans and sponsors. The cumulative score also enhances the importance of each of the independent tournament events by requiring a good showing in all of the independent tournament events in order to maintain top standing among participating players.

It is possible that not all players will participate in all of the same independent tournament events. In this case, the cumulative score for each player can be based only on the number of independent tournament events that the player participated in. While participating in less than all of the independent tournament events can detract from the cumulative score, the cumulative score can still hold value because similar players can be compared against each other.

After calculation of the cumulative score, each of the players can be ranked, for example, by score, −10, −7, +2, etc., by their relative position, $1^{st}$, $2^{nd}$, $3^{rd}$, etc., or by accumulated points based on the position of the player during each of the independent tournament events. Weighting systems can be applied to any of the individual scores or to any of the cumulative scores.

The calculation of the scores and the cumulative scores can be performed by computer software. In one implementation, a computer program can compile scores for the players from sanctioned sources, such as servers maintained or updated by the PGA, WPGA, etc. In other implementations, score data can be accessed from other servers, data repositories, or local memory storage.

A list, based on the ranking and/or the cumulative score, of the players and their performance up to this point in the series of Majors, can be provided for use by fans or sponsors. The list can be in the form of a chart, table, leaderboard, etc. The list can be displayed and promoted to television advertisers, internet advertisers, on-course advertisers, or displayed on social media sites or other internet forums. The list can also include other statistics relating to the scores, rankings, cumulative scores, or any other metric. For example, the tournament scoring program can generate comparisons with past competitions, trends, projections of future scores, etc.

The example shown in FIG. 1 describes four independent tournament events. Upon completion of the third Major, the cumulative score and ranking can be updated for those players participating in the third Major. The score for the third Major can be added to the cumulative score and the rankings recalculated accordingly. In this way, fan engagement is maintained as fans can observe the evolution of the player's position over time.

Upon completion of the fourth Major, the cumulative score can be further updated and additionally a final cumulative score can be determined (in the event of a terminal event in a series of independent tournament events). The final cumulative score can be used to determine an overall winner of the independent tournament events. Also, as discussed above, other winners can be selected according other categories, for example, a winner of the group that only participated in three of the four independent tournament events, etc. In the event of a tie, a playoff could be initiated to determine a winner, an alternate means of scoring can be imposed, or the recognition and/or awards could be shared between the tied players.

Recognition of any of the aforementioned winning players can be provided. The recognition can include, for example, award ceremonies, gala event (similar to the Academy Awards), trophies, titles, monetary prizes, future invitations to selected independent tournament events, endorsements, etc.

While the above has been described in the context of the four Majors, the system and methods described herein also apply to any number of independent tournament events. For example, if there are only three Majors in a given year, the winner can be selected based on the cumulative score of those three. Also, as has occurred historically, the number and character of these marquee tournaments have evolved. The above methods can be applied to future arrangements of these marquee independent tournament events with no loss of generality.

Figure 2:
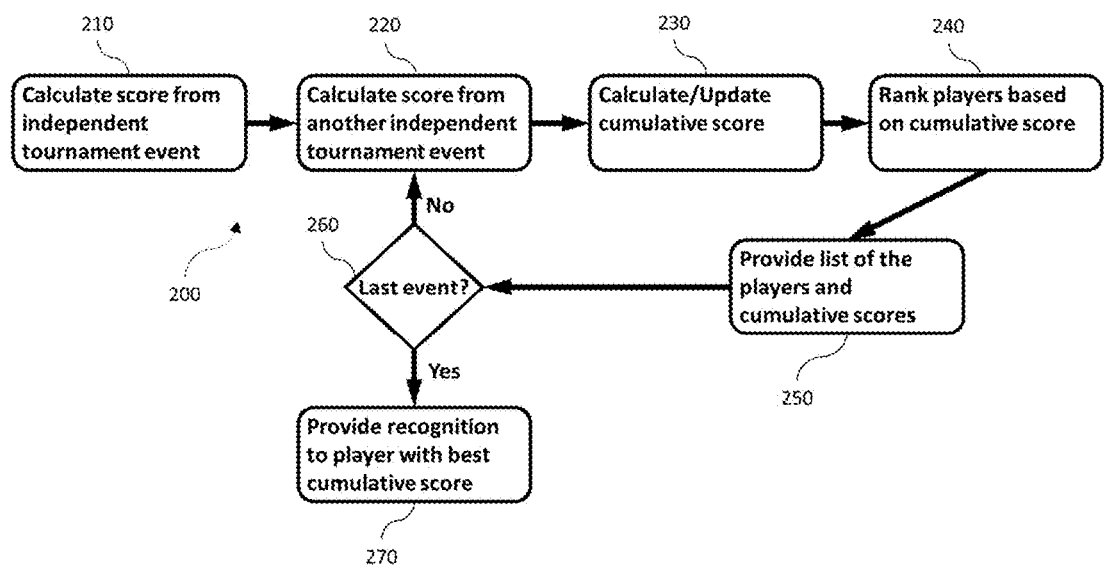
FIG. 2 is a process flow diagram illustrating the calculating the cumulative score across the series of independent tournament events, according to one embodiment.

FIG. 2 is a process flow diagram 200 illustrating the calculating the cumulative score across the series of independent tournament events. At 210, scores can be calculated for each of the players in the in the independent tournament events.

At 220, another score can be calculated from another independent tournament event.

At 230, the cumulative score is calculated and/or updated to reflect the score calculated at 220.

At 240, the ranking can be provided based on the cumulative score.

At 250, the list can be compiled and provided based on the cumulative score calculated at 230 and the ranking provided at 240.

At 260, it can be determined if the latest independent tournament event is the last event to be used in the cumulative scoring.

At 270, recognition can be provided to the player with the best cumulative score and/or ranking.

FIG. 3 is a table 310 illustrating the calculation of a cumulative score based on independent tournament event rankings. In some implementations, rather than calculating a cumulative score based on a series of independent scores, the cumulative score can be based on a players ranking during an independent tournament event. The cumulative score can be determined by adding the ranks of the players participating in each of the independent tournament events. The independent tournament events can include, for example, the World Golf Championship (WGC) Cadillac, the Masters, the Players, the U.S. Open, the British Open, the WGC Bridgestone, and the Professional Golfers Association (PGA) Championship, in any combination. In some implementations, weightings can be applied to each independent tournament event. In other implementations, only the best 6 out of every 7 independent tournament event scores can be counted towards the tournament scores. In another implementation, only the best 5 out of 6 independent tournament events can be used for the cumulative scoring described herein.

FIG. 3 shows one example where there are four independent tournament events including the Masters, US Open, British Open, and PGA Open. In each case, a partial roster of players and their rankings are shown. The first independent tournament event is the Masters, where Fowler came in 5th. The second independent tournament event is the US Open, where Fowler came in 2nd. Under this implementation, the cumulative score can be obtained by directly adding the player's rankings. For Fowler, this gives him a cumulative score of 7. The process can continue, with the tournament scoring program adding the rankings for each player at each stage. The values to be added can be accessed from, for example, a tournament server, or from the tournament scoring program. The cumulative score can be calculated, for example, after any number of independent tournament events or updated in a continuous manner after completion of another independent tournament event. The cumulative score can be transmitted to, for example, a website, server, mobile device, or the like, after the completion of a number of independent tournament events, for example, after the Majors. The cumulative score data and/or ranking data can also be transmitted to, for example, a website, server, mobile device, or the like, after an updating of the cumulative score data following another independent tournament event.

In some implementations, there can be an application running on a mobile device that can receive the transmitted cumulative score data and generate graphical and textual representations of the scores, rankings, or the like, for the players participating in the independent tournament events. The progress, scores, rankings, or the like, for the players can be transmitted to the websites, mobile applications, or the like, in real-time, or generally as soon as possible after completion of additional independent tournament events. The positions of the players as displayed can then be adjusted by the mobile device, or instructions can be sent to the mobile device specifying the new ordering of the players as determined by the tournament scoring program.

After the last independent tournament event, scores for the players that participated in all of the independent tournament events can be calculated and ranked (as shown by the Cum. Stage 4 column and the FINAL WC posn. column). From this example, Fowler would be determined to be the winner of the contest described herein.

As mentioned above, if a player does not participate in an independent tournament event, the process can reflect this in several ways. In some implementations, the player could be assigned a score of zero, and then added to the cumulative total. In this way, when, for one of the players, there is no player identification in one of either the first data or the second data (corresponding to two independent scoring events), that the cumulative rank is based on only the first rank or only the second rank. In other words, the cumulative score is not changed based on a player not participating in an independent tournament event. However, for example in golf, assigning a player a score of zero is not reflective of a lack of participation in the event. Therefore, in other implementations, if a player does not participate in an independent tournament event, then they can be removed from the cumulative score tracking from that point on. Optionally, they can be grouped with players that have completed the same set of independent tournament events and the score for those events calculated similarly to that described above.

Figure 4:
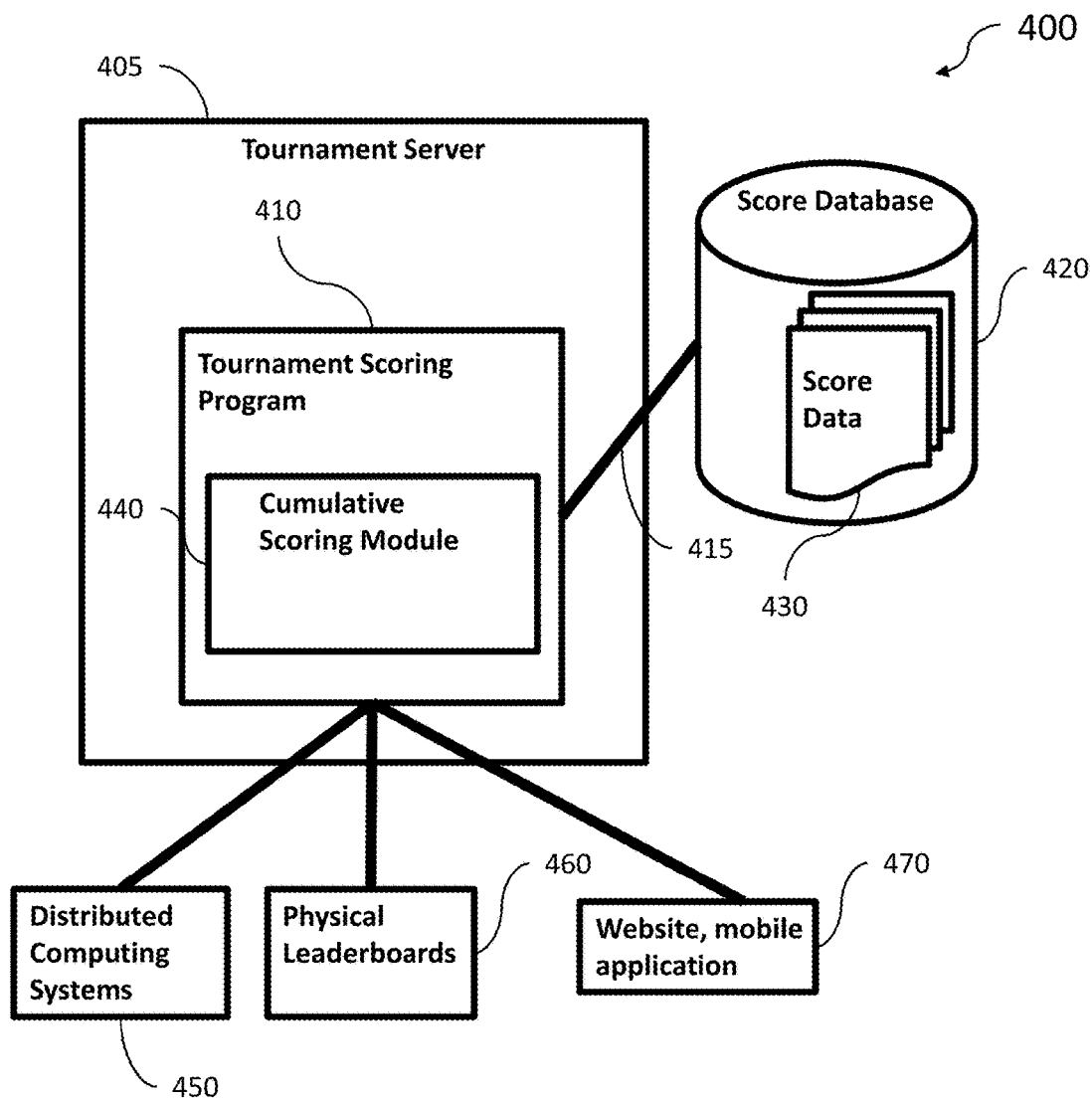
FIG. 4 is a diagram illustrating a system for calculating the cumulative score across the series of independent tournament events, according to one embodiment.

FIG. 4 is a diagram illustrating a system 400 for calculating the cumulative score across the series of independent tournament events. The tournament scoring program 410 can be implemented on, for example, a tournament server 405, which can be one or more computer systems. The tournament scoring program 410 can access a score database 420 that contains the score data 430 associated with the players participating in the independent tournament events. The score database 420, or any other computing systems described herein can, in some implementations, be connected by one or more network connections 415. The network connections 415 can be, for example, a local area network, wireless local area network, the Internet, wireless data connections, or the like. In some implementations, the score database 420 can be any sanctioned provider of the score data 430, such as PGA servers, WPGA servers, etc. As used herein, "sanctioned" refers to having official scores or rankings that are recognized as correct by the providers of the independent tournament events. In other implementations, the score data can be provided by other computer systems, or accessed locally by the tournament scoring program.

As used herein, "score data" can include, for example, scores, rankings, player identifications, contest identifiers, player handicaps that modify the score data or the calculation of the cumulative score, or the like. Again, as noted above, rankings can be used instead of scores to determine the placement of the players according to the cumulative scoring methods described herein. In this way, "scores", as used herein, can refer to any metric that is used by the tournament scoring program. For example, scores can be actual scores, rankings, or the like.

The score data 430 can be input to a cumulative scoring module 440 to calculate the cumulative score. The cumulative scoring module 440 can be a dedicated computer program that computes the cumulative score. This can be distinct from the tournament scoring program which can also execute, for example, operations of receiving score data and transmitting the cumulative scores, etc. The cumulative score, the rankings, and other data can be transmitted to distributed computing systems 450 such as internet websites, news outlets, social media sites, etc. The cumulative score can also be transmitted to physical leaderboards 460, such as on-course boards or advertisements, billboards, publications, or other physical realizations of the cumulative score and rankings. The cumulative score can also be transmitted to, for example, websites 470, mobile applications, or the like. The cumulative score can be generated as text or graphics on a graphical user interface, computer screen, mobile phone screen, or the like.

In order to preserve the Majors as a separate entity from the cumulative scoring methods and presentations described herein, the transmitting of the cumulative scores can be to personal displays accessible by, for example, players, staff, fans, or the like, but not necessarily broadcast publicly during the Majors events. The personal displays can again be displays on mobile applications, websites, leaderboards, or the like. In some implementations, the cumulative scores can be provided only to personal devices accessible by the players and not to the public at large.

FIG. 5 is a table illustrating the determination of a required score to attain a preselected ranking, according to one embodiment.

In some implementations, a real-time (or nearly so) calculation of what position a golfer needs to finish in a particular place can be determined. The determination can be performed for a given independent tournament event. In some implementations, the determination can be performed by calculating permutations of the scores of the remaining players to determine the highest possible scoring of the player after the next event. The table shown in FIG. 5 includes a first row 510 and a second row 560. The first row 510 contains scores for four players, which, in this example have an initial ranking of 1 through 4, in order, after the first independent tournament event 520. As one permutation, a hypothetical second independent tournament event 530, can be where all other players retain their relative positions except for player 4, who comes in $2^{nd}$. The cumulative score 540 can be determined as described herein and a final rank 550 determined. Here, based on the change in rankings at 530, the best that player 4 can do is tie for $2^{nd}$ place. Similarly, in the second row 560, a permutation is shown where player 4 comes in $1^{st}$ in the second independent tournament event 530. This again results in a two way tie for $2^{nd}$ place. In a similar manner, the permutations can be calculated and provided to websites, mobile applications, or the like, to show where a player can move to in the rankings, after a subsequent independent tournament event, subject to certain constraints for the other players. This feature, as well as other features described herein, allow there to be more interest beyond just the player that finishes first. Because a players rankings can move over time, not just in response to their own performance, but in the performance of their competitors, a player can perform well in the cumulative scoring sense by consistently performing well across all independent tournament events without having to win any or all of them (e.g. a player perform in each independent tournament event in as low as $5^{th}$ or $6^{th}$, for example, if the other competitors perform much worse in at least one other independent tournament event).

Figure 6:
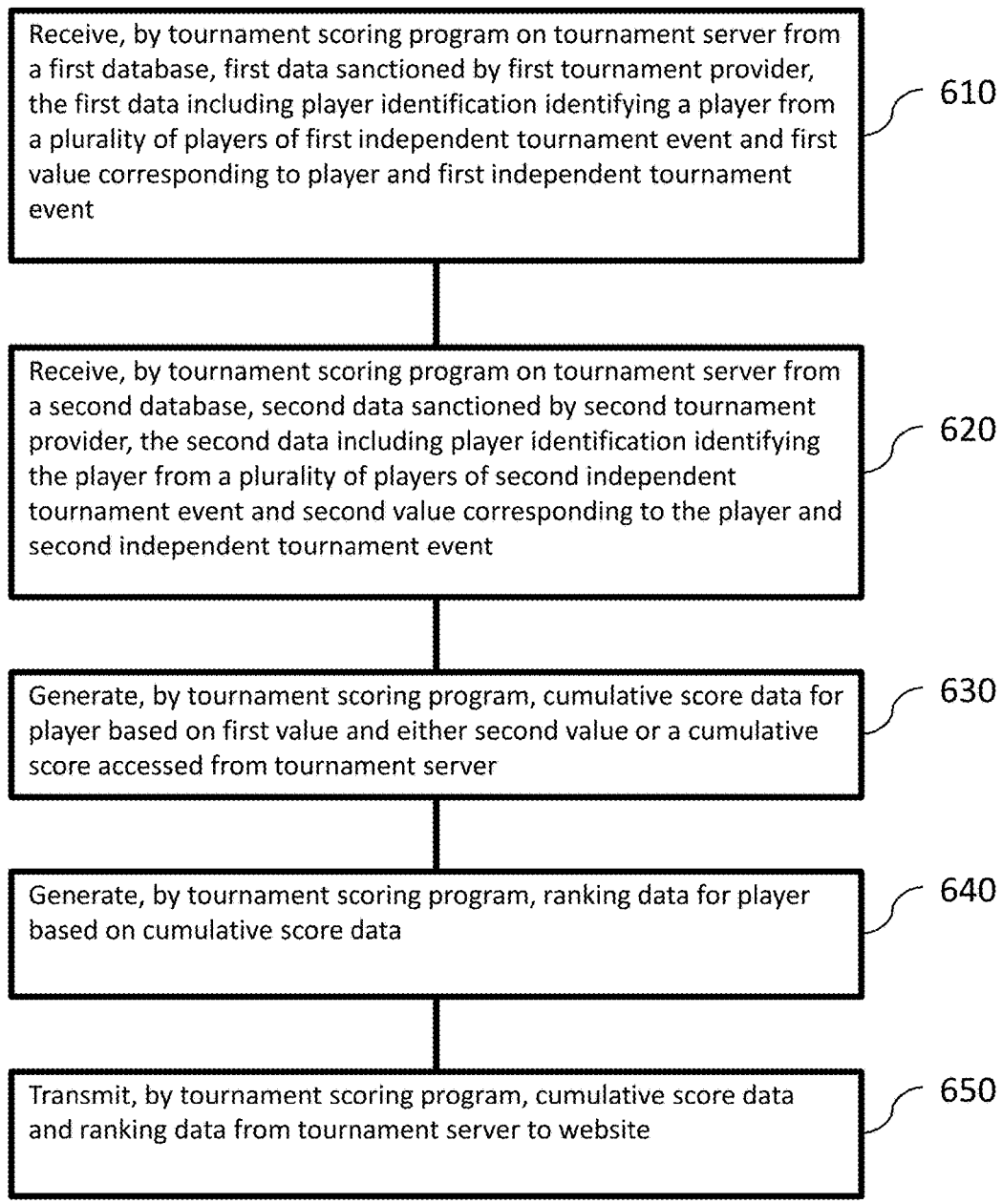
FIG. 6 is a process flow diagram illustrating determination of a cumulative score, according to one embodiment.

FIG. 6 is a process flow diagram illustrating determination of a cumulative score, consistent with some implementations of the current subject matter.

At 610, a tournament scoring program on the tournament server, can receive, from a first database via a first network connection, first data sanctioned by a first tournament provider. The first data can include a player identification identifying a player from a number of players of the first independent tournament event and also include a first value corresponding to player and the first independent tournament event.

At 620, the tournament scoring program can receive, from a second database via a second network connection, second data sanctioned by a second tournament provider. The second data can include the player identification identifying the player from a number of players of the second independent tournament event and also include a second value corresponding to player and the second independent tournament event. The first and/or the second data can include scores, rankings, or the like.

At 630, cumulative score data can be generated by the tournament scoring program for the player based on first value and either second value or a cumulative score accessed from tournament server. For example, the cumulative score data can be based on a previously calculated and stored cumulative score, to which score data for another independent tournament event can be added.

At 640, ranking data for at least one player based on cumulative score data can be generated by the tournament scoring program. Again, the ranking data can include ranks of the players participating in some or all of the independent scoring events. The ranks can be determined by any of the methods described above, for example, adding individual player scores across independent tournament events or adding individual player rankings across independent tournament events.

At 650, cumulative score data and/or ranking data can be transmitted, by the tournament scoring program, from the tournament server.

Figure 7:
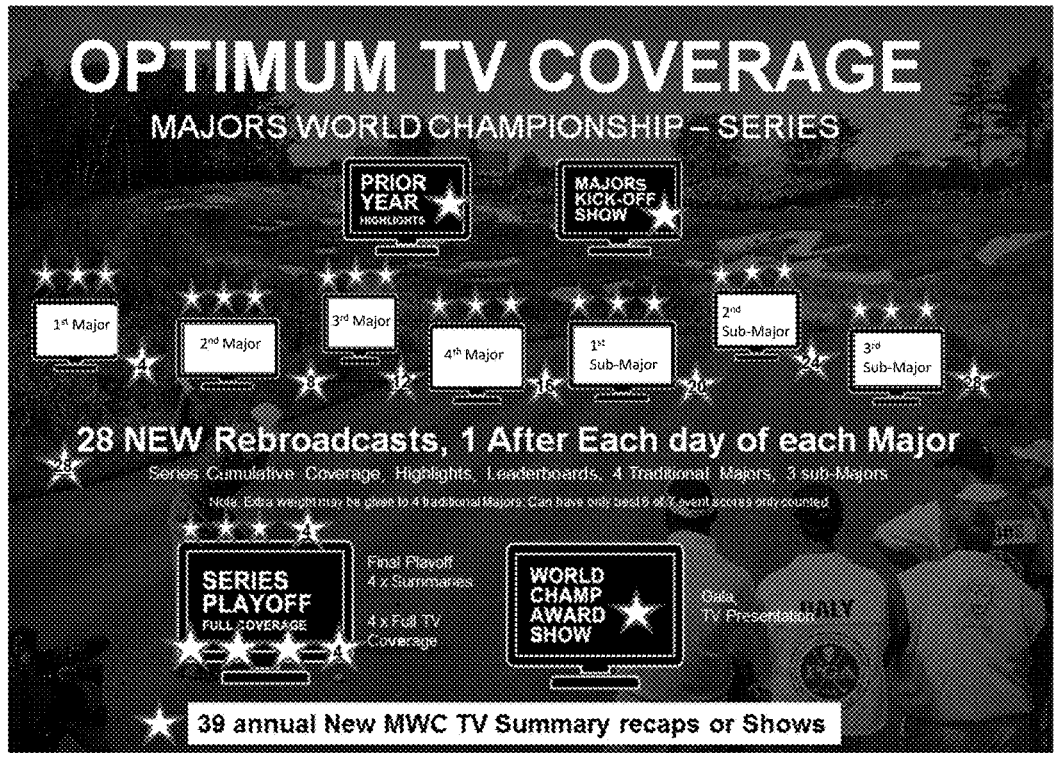
FIG. 7 is a diagram illustrating television rebroadcasts of independent tournament events, according to one embodiment.

FIG. 7 is a diagram illustrating television rebroadcasts of independent tournament events, according to one embodiment. In addition to television, radio, or internet broadcasts of the Majors (including sub-majors such as the Men's Tour, Women's Tour, and Seniors Tour), there can be similar rebroadcasts of each independent tournament event. The rebroadcast can include, for example, cumulative coverage, presentation of cumulative scores and/or rankings to track player progress, highlights of prior independent tournament events, leaderboards, Major golf tournaments, sub-Major golf tournaments, or the like.

In some implementations, there can be a recap, summary, or rebroadcast (collectively referred to herein as a "rebroadcast") after the conclusion of any or all of the independent tournament events, or at the conclusion of each day of a tournament. Optionally, the rebroadcasts described herein can include golf tournaments or other televised events that are not part of the Majors or other tournaments. For example, the rebroadcasts can include summarized or highlighted coverage of golf events leading up to the Majors.

The rebroadcast can include footage from any preceding independent tournament event (or other broadcast) and can also include original content such as editorializing, analysis, or the like. The rebroadcast can include footage from any combination of events that occurred over a specified time period, for example, that day, that week, that season, or the like. The rebroadcasts can also include presentation of the current leaderboards, scores, rankings, and cumulative scores of the event participants, including players in the independent tournament events.

The rebroadcasts can include, in some implementations, transmitting by a broadcast system to a media receiver, of a first media segment. As used herein, the transmission of the rebroadcasts does not include any transitory propagating signals per se. Rather, the transmitting is referring to electronic operations conducted by hardware and/or software that result in the transmission of video, audio, and/or data as described herein. The broadcast system can include, for example, a television broadcasting system such as a television station, a radio broadcasting system such as a radio station, an internet broadcasting system such as a computer connected to a communications network or internet connection, or the like. The media receiver can be, for example, televisions, radios, computers, cellular telephones, smartphones, mobile computers, or the like. The first media segment can include audio, video, or data that includes embedded instructions for the media receiver to generate audio and/or video.

As described above, the rebroadcast can generally be an assembled subset of one or more broadcasts. The rebroadcast can be a first media segment that contains a portion of one or more event broadcasts (collectively referred to herein as a second media segment). The second media segment can include media recordings of one or more events in the form of, for example audio, video, and/or data. The events can be any combination of Major golf tournaments, sub-Major golf tournaments, and independent tournament events. The assembly of the first media segment from the second media segment can include extracting a portion of the second media segment. The extracted portion (or portions) of the second media segment can be combined to form the first media segment. The assembly, extracting, and/or combining can be performed by, for example, digital splicing, selective playback of stored media events, or the like. The assembly can be performed by the broadcast system or any connected computing system. Alternatively, the assembly can be done on a computing system remote from the broadcast system that receives the video, audio, or data comprising the rebroadcast.

The event or events present in the media recordings (the first and second media segments) can include, for example, a golf event (such as a Major or a sub-Major), an independent tournament event, a playoff, or the like.

In some implementations, the first media segment can include at least seven portions corresponding to four different major golf tournaments (such as the Majors) and three sub-major golf tournaments. This would provide a comprehensive summary or highlights of the events leading up to the playoff shown in FIG. 7. In addition, after the playoff where an overall winner is determined, the first media segment can include a portion of the playoff golf event.

Also, being a rebroadcast, the transmitting can occur at a predetermined time after the events or tournaments corresponding to the second media segment have been completed. In some implementations, the rebroadcast can occur approximately immediately after the events have completed, an hour after, two hours after, the next day, or the like. The duration of the first media segment can be substantially less than the duration of the second media segment. For example, the duration of first media segment can be less than half, less than a quarter, or less than an eighth of the duration of the second media segment. The rebroadcasts can be of any duration, for example, 15 minutes, 30 minutes, 1 hour, 2 hours, 3 hours, or the like.

After the last independent tournament event is concluded, there can optionally be a series playoff that includes any number of leaders based on the cumulative score. For example, the series playoff can be between the top 2, 5, 10, 20, players. The series playoff can be moved and played at any time after the completion of the independent tournament events. After the playoff is concluded, or if no playoff is performed, then at any point where a winner is determined based on the cumulative score, a world champion can be determined and recognized.

After the series playoff, there can be a world championship award show that can include an academy award style gala and a television presentation of awards, prizes, and other recognition to the player that has received the highest cumulative score. In some implementations, runner-ups can also be recognized in a similar manner. Any or all of these events can include one or more sponsors to provide funds in exchange for advertisement and promotion of the events and their respective brands.

As shown in FIG. 7 by the stars, there can be multiple rebroadcasts as part of televising the Majors and other tournament events. In some implementations, the number and types of rebroadcasts can be as follows. There can be a prior year highlights broadcast and a Major's kick-off broadcast before the Majors begin. Following each day of play in a given Major or sub-Major, there can be a rebroadcast, as described above. This results in a total of 30 broadcasts or rebroadcasts when there are four Majors and three sub-Majors. The series playoff can also span four days, each with its own televised event and also have four playoff summary broadcasts. The daily summary broadcasts during the playoff can each be one hour, with the final summary being longer, for example, two hours. Finally, the world champion award show can be broadcast after the conclusion of the series playoff. In this implementation, there can be a total of 39 broadcasts or rebroadcasts. The duration of each broadcast can vary, for example, being a half hour, hour, two hours, and the like.

In another implementation, the highlights following each day of a four day Major golf tournament can be assembled and transmitted on, for example, Tuesday, Wednesday, Thursday, and Friday. Here, each rebroadcast can include a portion of the Major golf tournament that occurred the day prior, or can include a cumulative summary of the Major golf tournament to date. The daily rebroadcasts can be of a shorter duration, for example, a half hour, one hour, and the like. After the conclusion of the Major golf tournament, there can be a longer rebroadcast, for example two hours in duration. This longer rebroadcast can be on a Monday following the four earlier daily rebroadcasts. Similar four-day rebroadcasts followed by a longer Monday rebroadcast can also be assembled and transmitted for sub-Major golf events, independent tournament events, playoffs, and the like.

For years in which there was no series playoff or world championship award, there can be retroactive determination of winners, runner-ups, or the like, according to any of the scoring or ranking methods described herein. These retroactive determinations can then be recognized with awards, prizes, and rebroadcasts of the original independent tournament events, also as described herein.

Figure 8:
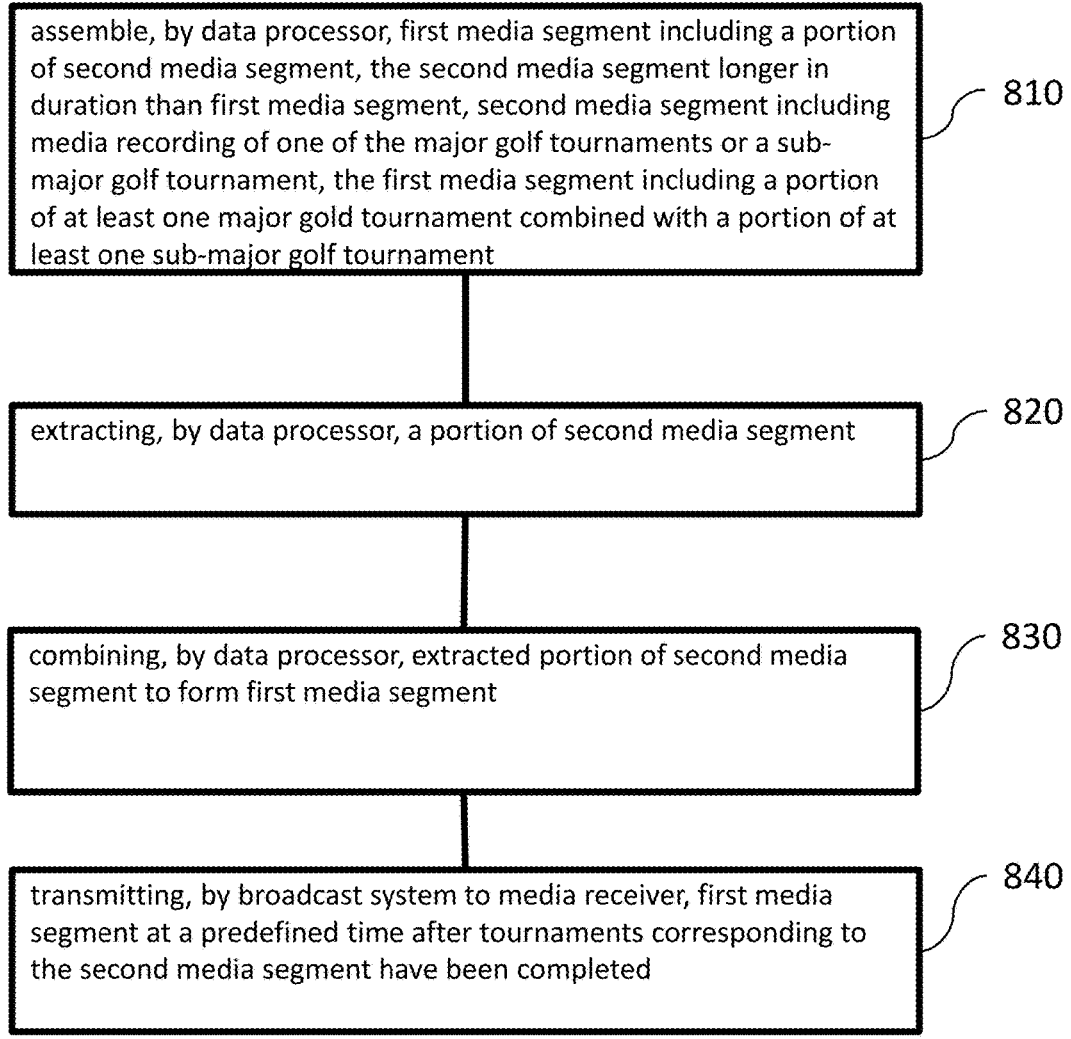
FIG. 8 is a process flow diagram illustrating a method of rebroadcasting events, according to one embodiment.

FIG. 8 is a process flow diagram illustrating a method of rebroadcasting events, according to one embodiment.

At 810, a first media segment, for example a rebroadcast, can be assembled that can include a portion of second media segment, for example an independent tournament event. The second media segment can be longer in duration than first media segment. The second media segment can be a media recording of an event such as a golf event or an independent tournament event.

At 820, a portion (or multiple portions) of the second media segment can be extracted as part of assembling the first media segment.

At 830, the portion(s) can be combined to form the first media segment (e.g. the rebroadcast, summary, or recap).

At 840, a broadcast system can transmit to a media receiver the first media segment at a predefined time after the event has been completed.

Implementations of the current subject matter can include, but are not limited to, articles of manufacture (e.g. apparatuses, systems, etc.), methods of making or use, compositions of matter, or the like consistent with the descriptions provided herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, or the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Because of the high-level nature and complexity of the selections and methods described herein, including the multiple and varied combinations of different calculations, computations and selections, such selections and methods cannot be done in real time quickly, or at all, by a human. The processes described herein rely on the machines described herein.

What is claimed is:

1. A computer-implemented method for implementation by at least one data processor, the method comprising:
    extracting, by the at least one data processor, a portion of a second media segment of a tournament event of a plurality of tournament events, the portion of the second media segment comprising digitally recorded audio and/or video of the tournament event and/or selected other tournament events of the plurality of tournament events, the portion of the second media segment further comprising a score for the tournament event, a cumulative score for the plurality of tournament events, and a ranking for each player of the tournament event or plurality of tournament events;
    assembling, by the at least one data processor, a first media segment comprising the extracted portion of the second media segment, the second media segment being longer in duration than the first media segment;
    storing, by the at least one data processor, the first media segment in a memory storage associated with the computer, the storing including calculating the cumulative score for the plurality of tournament events; and
    transmitting, by a broadcast system from the memory storage to at least one media receiver, the first media segment at a predefined time after each tournament event of the plurality of tournament events has been completed.

2. The method of claim 1, wherein the first media segment comprises an audio portion and a video portion.

3. The method of claim 2, wherein the first media segment is transmitted via an internet connection and the at least one media receiver is a computing device.

4. The method of claim 1, wherein a first duration of the first media segment is less than half of a second duration of the second media segment.

5. The method of claim 4, wherein the first duration is approximately one hour and the second duration is at least 4 hours.

6. The method of claim 1, the first media segment further comprising at least seven portions corresponding to four different major golf tournaments and three sub-major golf tournaments.

7. The method of claim 1, the first media segment further comprising at least one additional portion of a playoff golf event.

8. A computer program product comprising a non-transient, machine-readable medium storing instructions which, when executed by at least one programmable processor, cause the at least one programmable processor to perform operations comprising:
 extracting, by the at least one data processor, a portion of a second media segment of a tournament event of a plurality of tournament events, the portion of the second media segment comprising digitally recorded audio and/or video of the tournament event and/or selected other tournament events of the plurality of tournament events, the portion of the second media segment further comprising a score for the tournament event, a cumulative score for the plurality of tournament events, and a ranking for each player of the tournament event or plurality of tournament events;
 assembling, by the at least one data processor, a first media segment comprising the extracted portion of the second media segment, the second media segment being longer in duration than the first media segment;
 storing, by the at least one data processor, the first media segment in a memory storage associated with the computer, the storing including calculating the cumulative score for the plurality of tournament events; and
 transmitting, by a broadcast system from the memory storage to at least one media receiver, the first media segment at a predefined time after each tournament event of the plurality of tournament events has been completed.

9. The computer program product of claim 8, wherein the first media segment comprises an audio portion and a video portion.

10. The computer program product of claim 9, wherein the first media segment is transmitted via an internet connection and the at least one media receiver is a computing device.

11. The computer program product of claim 8, wherein a first duration of the first media segment is less than half of a second duration of the second media segment.

12. The computer program product of claim 11, wherein the first duration is approximately one hour and the second duration is at least 4 hours.

13. A system comprising:
 a programmable processor; and
 a non-transient machine-readable medium storing instructions which, when executed by the processor, cause the at least one programmable processor to perform operations comprising:
  extracting, by the at least one data processor, a portion of a second media segment of a tournament event of a plurality of tournament events, the portion of the second media segment comprising digitally recorded audio and/or video of the tournament event and/or selected other tournament events of the plurality of tournament events, the portion of the second media segment further comprising a score for the tournament event, a cumulative score for the plurality of tournament events, and a ranking for each player of the tournament event or plurality of tournament events;
  assembling, by the at least one data processor, a first media segment comprising the extracted portion of the second media segment, the second media segment being longer in duration than the first media segment;
  storing, by the at least one data processor, the first media segment in a memory storage associated with the computer, the storing including calculating the cumulative score for the plurality of tournament events; and
  transmitting, by a broadcast system from the memory storage to at least one media receiver, the first media segment at a predefined time after each tournament event of the plurality of tournament events has been completed.

14. The system of claim 13, wherein the first media segment comprises an audio portion and a video portion.

15. The system of claim 14, wherein the first media segment is transmitted via an internet connection and the at least one media receiver is a computing device.

16. The system of claim 13, wherein a first duration of the first media segment is less than half of a second duration of the second media segment.

17. The system of claim 16, wherein the first duration is approximately one hour and the second duration is at least 4 hours.

* * * * *